(12) United States Patent
Flocken

(10) Patent No.: US 7,334,028 B2
(45) Date of Patent: Feb. 19, 2008

(54) TIERED MULTI-SOURCE SOFTWARE SUPPORT USING AUTOMATED DIAGNOSTIC-DATA TRANSFERS

(75) Inventor: Philip A. Flocken, Denver, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 997 days.

(21) Appl. No.: 10/722,337

(22) Filed: Nov. 25, 2003

(65) Prior Publication Data

US 2004/0236820 A1 Nov. 25, 2004

Related U.S. Application Data

(63) Continuation-in-part of application No. 10/442,592, filed on May 21, 2003.

(51) Int. Cl.
*G06F 15/173* (2006.01)

(52) U.S. Cl. .................................... 709/223; 714/37

(58) Field of Classification Search ................ 709/223; 714/30, 37, 38
See application file for complete search history.

(56) References Cited

U.S. PATENT DOCUMENTS 5,678,002 A * 10/1997 Fawcett et al. ............. 715/709
6,356,909 B1 * 3/2002 Spencer ....................... 707/10
6,460,070 B1 10/2002 Turek et al.
6,516,427 B1 * 2/2003 Keyes et al. .................. 714/25
6,587,836 B1 * 7/2003 Ahlberg et al. .............. 705/26
7,260,597 B1 * 8/2007 Hofrichter et al. .......... 709/200
2002/0194320 A1 * 12/2002 Collins et al. .............. 709/223
2003/0033397 A1 * 2/2003 Gurumoorthy et al. ..... 709/223
2003/0033545 A1 2/2003 Wenisch

FOREIGN PATENT DOCUMENTS

| EP | 1109101 | 6/2001 |
|---|---|---|
| WO | WO 97/15009 | 4/1997 |
| WO | WO 03/019377 | 3/2003 |

* cited by examiner

*Primary Examiner*—Krisna Lim

(57) ABSTRACT

Primary and secondary support vendors 20 and 30 provide support for an application 15 running on a customer computer system 11. Diagnostic software 17 running on the customer computer system gathers diagnostic data, which is transmitted to the primary-support vendor's computer system 21. There, the diagnostic data is analyzed to determine whether the help of the secondary support vendor is required. If so, the diagnostic data is repackaged for transmission to the secondary support vendor. The results of the secondary analysis are returned to the primary support vendor's computer system and used to generate a proposed solution, which is made available to the customer 10.

15 Claims, 3 Drawing Sheets

TIERED MULTI-SOURCE SOFTWARE SUPPORT USING AUTOMATED DIAGNOSTIC-DATA TRANSFERS

RELATED APPLICATIONS

This is a continuation-in-part of copending U.S. patent application Ser. No. 10/442,592, filed May 21, 2003, entitled "Computer Service Using Automated Local Diagnostic Data Collection and Automated Remote Analysis", which is hereby incorporated by reference in its entirety.

BACKGROUND OF THE INVENTION

The present invention relates to computers and, more particularly, to computer support services. The present invention facilitates cooperative support services when the services of more than one vendor are required.

Much of modern progress is associated with the development and proliferation of computers that manipulate data in accordance with programs of instructions. Printed and electronic documentations are typically made available to assist users in using computer programs. However, it is not uncommon for software vendors to be inundated with requests for support.

Currently, the software support organizations of many software vendors rely on third party software support partners or value added resellers (VARs) to alleviate the full burden of supporting their software. These third-party support providers often provide their direct customers with customized versions of the base software products as a value add. When there are issues with the product, the customer contacts the third party vendor, who investigates the problem to determine if it lies within the bounds of the customization or if it is a base product level issue that they cannot fix with a known patch or configuration change.

In the case of a base product issue, the third party vendor must in turn contact the software vendor that supplies the base software product. The original software vendor must then determine the cause of the issue and a solution for the issue. This information is conveyed back to the third party support provider, which in turn must convey the information to the end customer or provide the appropriate fix for the customer. In this scenario, the third-party and original vendor support personnel must spend time by both manually examining the customer issues and relaying information back and forth between the third party organization and base software vendor company. These multiple exchanges result in considerable delays for the waiting customer.

In another scenario, a first vendor provides software that integrates with that of a second vendor. If the vendors do not cooperate, customers might find themselves without a solution when each vendor attributes a problem to the other's software. If they do cooperate, inter-vendor interactions are costly to the vendors and result in frustrating delays to customers. What is needed is a system, preferably highly automated, for providing coordinated support from different vendors to a user.

SUMMARY OF THE INVENTION

The present invention provides for automated tiered software support using automated diagnostic data transfers on at least two levels. The present invention is most applicable where software from one vendor integrates tightly with software from another vendor. However, the invention is applicable to almost any combination of hardware and software associated with a common computer system.

As in the single-tier system disclosed in the parent application, data gathering software on the user's computer can gather diagnostic data for a first vendor's application on an ongoing basis. When a first-level support session is initiated, the collected diagnostic data can be transferred to the vendor's support system. The vendor's support system analyzes the diagnostic data and attempts to solve a support issue.

If the first-level session fails to provide a support solution, the first vendor's system can contact a second vendor's system for support. In the course of a second-level support session, diagnostic data is transferred from the first vendor's system to the second vendor's system. The original diagnostic data from the user system may be modified (e.g., to preserve privacy) and supplemented (e.g., with information from the first-vendor's knowledge base) prior to transfer to the second vendor.

The second vendor analyzes the diagnostic data it receives to provide a solution or at least information helpful in arriving at a solution to the first vendor. The first vendor then uses the information from the second vendor to provide a solution to the user. Also, the second vendor can provide direct support to users, and each vendor may serve as a second tier to the other. Furthermore, the invention can involve more than two tiers of support.

From the user's perspective, the knowledge base of plural vendors can be accessed in a session with a single vendor. In general, the user is not shuttled between vendors that both deny responsibility for a problem. From the vendor's perspective, users are automatically and effectively serviced in an economical manner. These and other features and advantages of the invention are apparent from the description below with reference to the following drawings.

DETAILED DESCRIPTION

Figure 1:
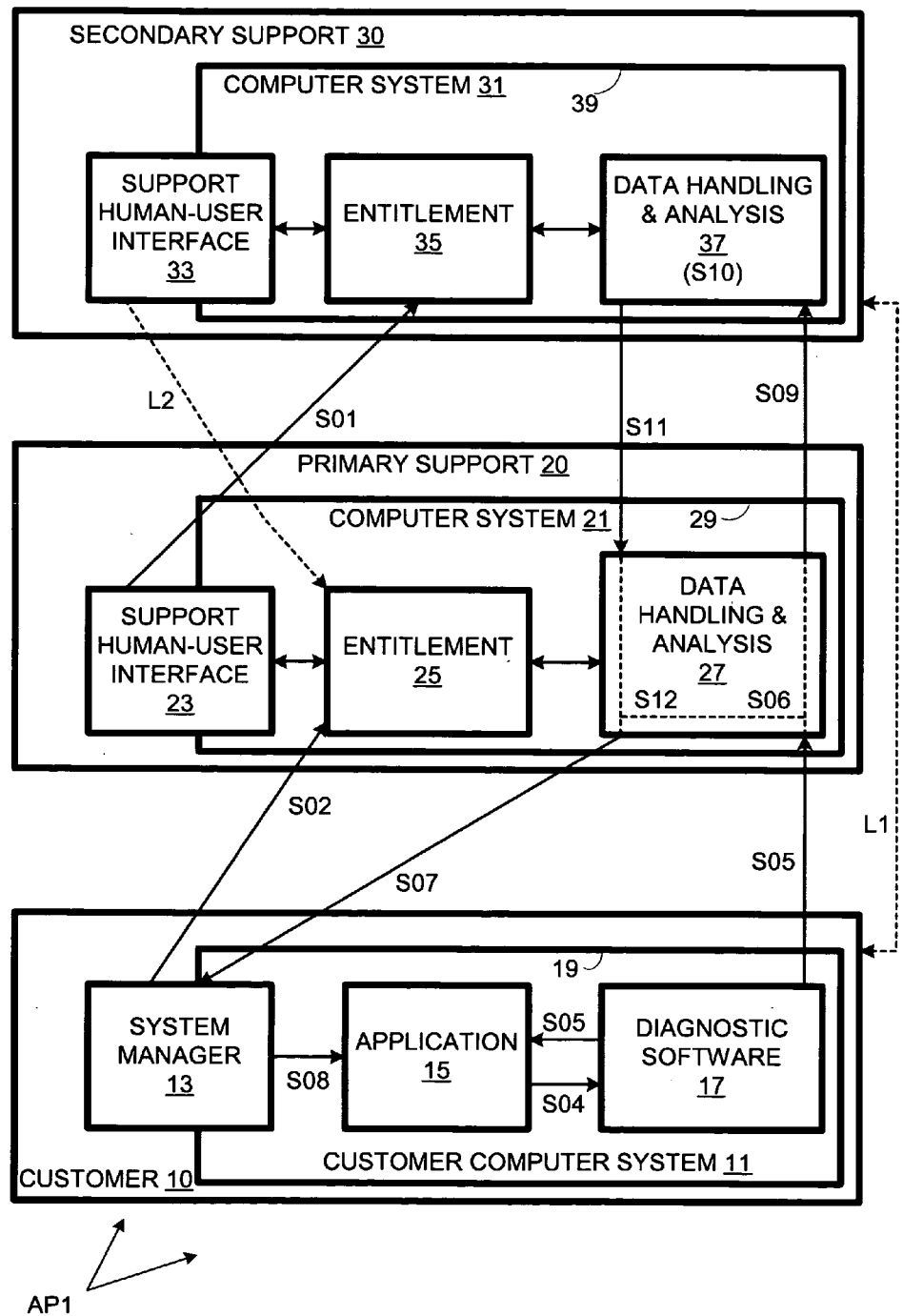
FIG. 1 is a schematic illustration of a multi-tier software support system in accordance with the present invention.

The present invention governs interactions among a customer 10, a primary support vendor 20, and a secondary support vendor 30. Much of the interaction is automated among their respective computer systems 11, 21, and 31. Customer 10 provides for human and automated system management 13 of customer computer system 11, which runs an application 15 and diagnostic software 17. Primary support vendor 20 includes a support interface 23, which manages the primary support vendor's interactions with customer 10 and secondary support vendor 30. In addition, interface 23 provides for management of first vendor computer system 21, which runs entitlement software 25 and data-handling-and-analysis software 27. Secondary support vendor 30 is analogous to primary support vendor 20, having a support interface 33 that manages interactions with customer 10 and first support vendor 20, and manages second-support computer system 31, which runs entitlement software 35 and data-handling-and-analysis software 37.

In this embodiment, application software 15, a network management program, is developed and marketed by secondary support vendor 30. The instance of application software on customer computer system 11 has been customized by primary support vendor 20, a value-added reseller, for customer 10. Alternatively, the primary support vendor can be a third-party support provider that has not added value to application 15, but has been engaged by a manufacturer to assist with the support function.

Analysis software 27 is developed from a pre-packaged programmable framework with application programming interfaces (APIs) so that it can be interfaced with the primary vendor's pre-existing hardware and software. Data-handling-and-analysis software 27 and diagnostic software 17 cooperate as server and client, respectively, to provide distributed automated support for application 15 running on customer computer 21.

Diagnostic software 17 monitors application 15 on customer computer system 11, gathering configuration and usage data. When it detects failures in software application 15, diagnostic program 17 gathers diagnostic data about the fault and the customer hardware/software environment. Diagnostic software 17 forwards the diagnostic data to data-handling-and-analysis software 27 running on primary vendor computer system 21. Data-handling-and-analysis software 27 automatically receives the diagnostic data, and has entitlement software 25 to authenticate the customer using identification information embedded in the diagnostic data.

Data-handling-and-analysis software 27 then analyzes the diagnostic data to determine if a solution can be provided by primary vendor 20 or whether support from secondary support vendor 30 is required. Help from vendor 30 may be required, for example, when the diagnostic data indicates a problem unrelated to customization and not addressed by any solution published by primary vendor 20. If secondary support is required, data-handling-and-analysis software 27 transmits diagnostic data to analysis software 37, and then integrates the response into a "solution" it makes available to customer 10. This method is described in greater detail below.

Primary support computer system 21 runs entitlement software 25 and data-handling-and-analysis software 27. Data-handling-and-analysis software 27 is used to analyze diagnostic data gathered by diagnostic software program 17 and transmitted to primary support computer system 21. Entitlement software 25 is used to check, at various stages in a support procedure, whether a customer is entitled to any services, and, if so, to what level.

Secondary support computer system 31 similarly runs entitlement software 35 and data-handling-and-analysis software 37. In this case, data-handling-and-analysis software 37 analyzes diagnostic data provided by primary-support computer system 21. The diagnostic data provided by primary-support computer system in general includes at least some of the diagnostic data received from customer computer system 11. However, some information may be removed, especially customer ID information, and some may be added, e.g., information about similar situations in a knowledge base included in data-handling-and-analysis software 27. Entitlement software 35 checks on the level of services primary-support vendor 20 is entitled to from second-support vendor 30.

Figure 2:
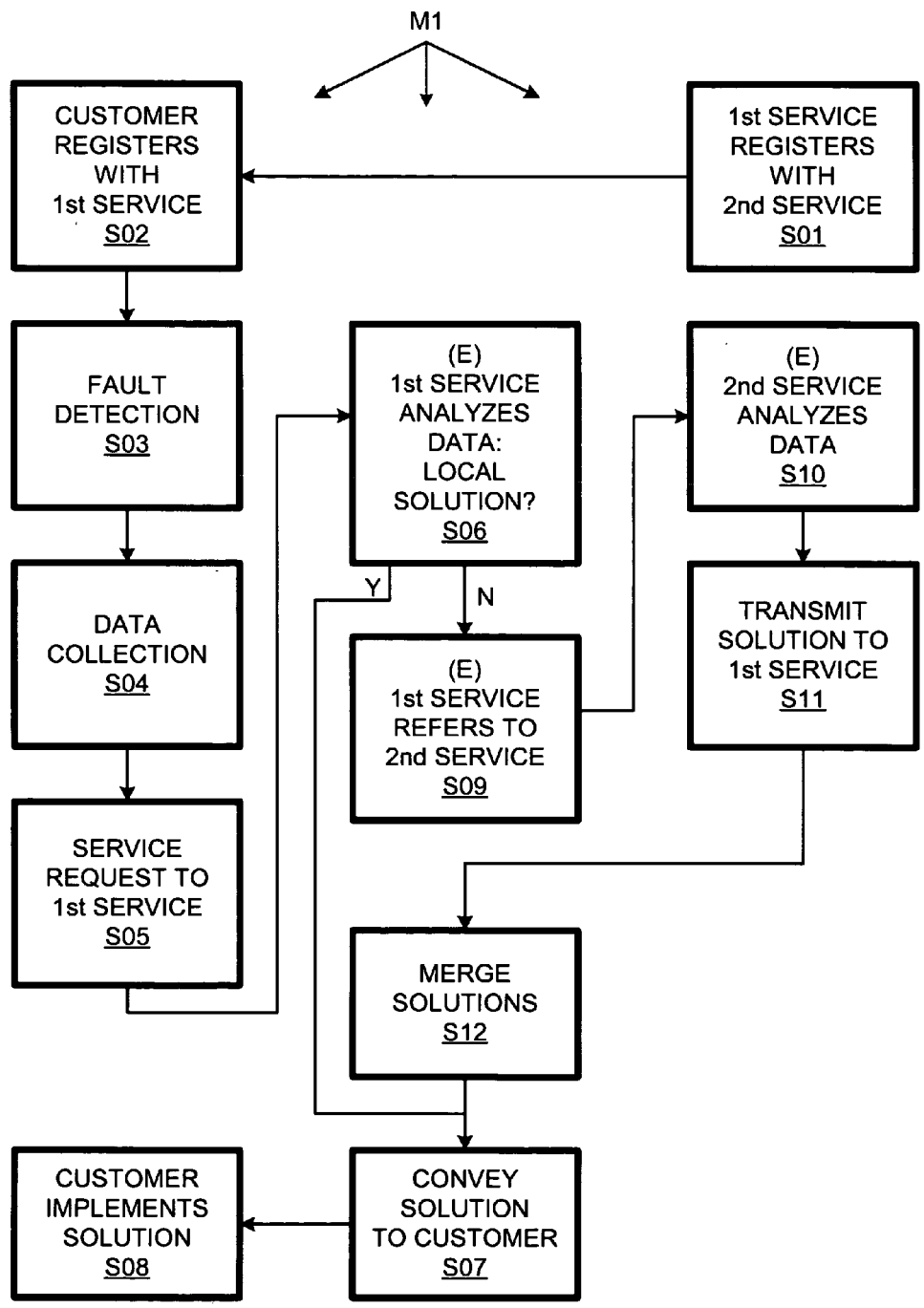
FIG. 2 is a flow chart of a method of the invention practiced in the context of the system of FIG. 1. Steps including an "(E)" are subject to an entitlement check.

A method M1 practiced in the context of system AP1 is flow-charted in FIG. 2. Primary support vendor 20 registers with secondary support vendor 30 at step S01 so that secondary-vendor entitlement software 35 "knows" primary support vendor and what level of support primary support vendor is entitled to. For example, the support level and procedures can be different for a value-added reseller than for an end-user. Primary support vendor 20 thus can register with secondary support vendor 30 as a value-added reseller. Note that primary support vendor 20 may also register as a user, if an instance of application 15 is running on primary-vendor computer system 21.

Customer 10 registers, at step S02, with primary support vendor 20 so that primary-support entitlement software is informed of the existence and support level for customer 10. Step S02 occurred after step S01, as primary support vendor 20 desired developer support from secondary vendor 30 prior to the time the customized version of application 15 was provided to customer 10. However, the invention provides for these steps to occur in either order.

A fault in application 15 or another triggering condition is detected at step S03. A fault can be the failure of a message to be delivered as addressed; another triggering event can be a time-based warning that a license for application 15 or other software is due to expire. The event triggers data collection at step S04. Data collection step S04 can be on-going, even in the absence of a fault. For example, usage, configuration, and context data can be collected continuously. However, additional a system "snapshot" can be collected at the time of fault detection, depending on the nature of the fault or other triggering event.

Customer system 11 requests support from primary support vendor 20 at step S05. Alternatively, diagnostic software can report the fault to a human user of computer system 11, who can then make the request, e.g., by accessing a website of primary-support vendor 20. The request involves transferring diagnostic data gathered by diagnostic software 27 to primary support computer system 21.

Primary-support data-handling-and-analysis software 27 analyzes the diagnostic data at step S06. As indicated by the "E" in the figure-text description of step S04, the analysis is conditioned on an entitlement check. The diagnostic data includes customer identification data including, for example, a license or contract number. Data-handling-and-analysis software 27 extracts the identification data and forwards it to entitlement software 25. Entitlement software 25 checks the contract ID against an included entitlement database. If customer 10 is entitled to the requested service, the analysis proceeds immediately. If the entitlement check indicates customer 10 is not entitled to the requested support, a procedure is initiated that will allow customer 10 to become entitled (or, to have entitlement recognize, if customer 10 is truly entitled to the service). Once customer 10 is entitled to the requested support, the analysis continues.

Data-handling-and-analysis software 27 analyzes the usage, configuration, and context information along with any circumstances relating to the fault that instigated the request. The analysis can refer to an included expert system or other such system that correlates this problem with other problems and other knowledge. Method M1 then branches at step S05 depending on whether a local solution is determined at step S04.

If the analysis at step S06 yields a solution, it is made available to customer 10 at step S06. This can involve notifying customer 10 that a solution has been identified. For example, computer system 21 can generate an e-mail to a contact person at customer 10 and include within the e-mail a link specifying a URL (Uniform Resource Locator) for a World-Wide-Web address. By clicking on the link, the contact person can access a website controlled by primary support vendor 20 that presents a solution. The "solution"

can include, for examples, a procedure to correct a problem, a file to be downloaded to patch application 15, a determination that the problem does not require corrective action, or a recommendation to escalate the fault into a formal support case to involve support personnel of primary vendor 20. Customer 10 can implement the proposed solution at step S06.

If the initial analysis at step S06 determines that help from secondary support vendor 30 is required, method M1 branches to step S09, for referring the problem to secondary support computer system 31. Referring step S09 can be subject to an entitlement procedure. Specifically, the customer ID information is sent to entitlement software 25 to determine if customer 10 is entitled to have support assisted by secondary support vendor 30. For example, local support may be free or available for a low fee, but a premium support contract may be required for services involving secondary support vendor 30, e.g., because secondary support vendor 30 charges primary support vendor for the service. If entitlement check fails at step S08, customer 10 can be given a chance to upgrade the support level so the analysis can continue.

Once customer 10 is entitled to secondary support, primary support computer system 21 transmits diagnostic data to secondary support computer system 31 at step S09. The diagnostic data transmitted to computer system 31 need not be the same as the diagnostic data received by system 21 from customer computer system 11. For example, customer ID information may be replaced by ID information for primary-support vendor 20. Information determined to be irrelevant to the problem can be removed. Other information may be added, for example, data collected by primary support vendor 20 from similar incidents.

Secondary support computer system 31 analyzes the diagnostic data it receives at step S10. This step S10 is subject to an entitlement check by secondary-support entitlement software 35 and is based on the registration at step S01 and updates thereto. Entitlement software 35 recognizes the identifier as belonging to a value-added reseller so that the appropriate level of support is applied.

A solution (or other result) generated by the secondary analysis is returned to primary support computer system 21 at step S11. If appropriate, data-handling-and-analysis software 27 can merge the remote results with its own local findings (including those generated in step S06 as well as any generated later in step S12) in generating its proposed solution. It can also update its knowledge base. The proposed solution is made available at step S07, who can implement the solution at step S08. For example, system manager 13 can download and install a patch to application 15.

Customer 10 is not necessarily restricted to indirect access to support from secondary vendor 30. The solution generated at step S12 can be for customer 10 to contact secondary support vendor either at a website or over the phone. Also, a solution may be to download an update from a website of secondary vendor 30.

In addition, customer 10 can have an independent direct support relationship with secondary support vendor 30 as indicated by line L1 in FIG. 1. For example, customer 10 may have a support relationship as a result of registering application 15 with secondary vendor 30. There may be a second diagnostic software package on customer system 11 for gathering data to be used directly by secondary support vendor 30. Alternatively, diagnostic software can be set up to support either multiple applications or multiple vendors or both. Furthermore, secondary support vendor 30 can be registered with primary support vendor 20 as indicated by line L2 of FIG. 1. This would allow a problem initially referred to vendor 30 to be referred to vendor 20.

Figure 3:
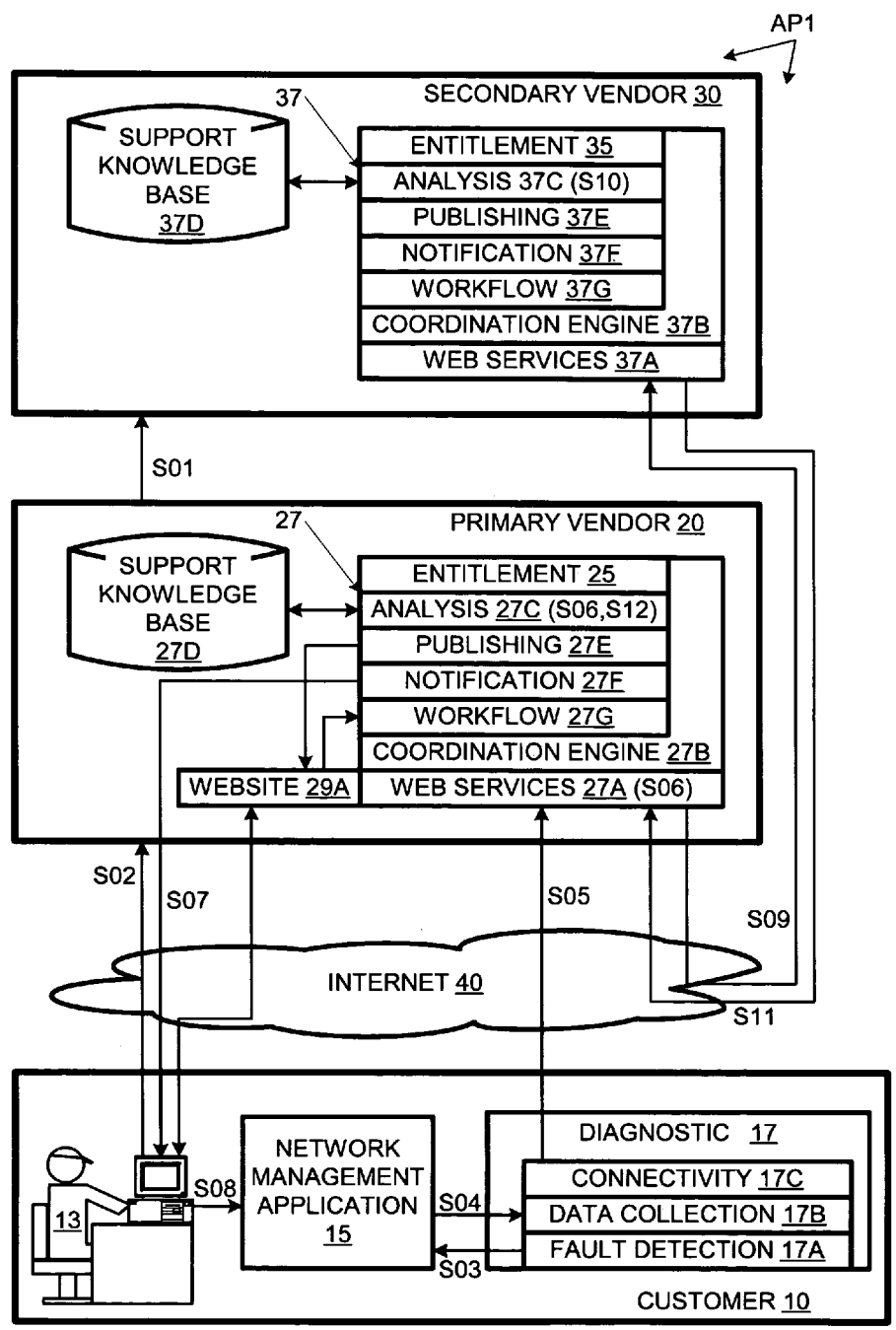
FIG. 3 is a more detailed view of the multi-tier software support system of FIG. 1.

A more detailed view of tiered system AP1 is provided in FIG. 3. Diagnostic software includes a fault-detection component 17A, a data-collection component 17B, and a connectivity component 17C. Fault detection component 17A monitors network management application 15 continuously, and, when a fault is detected at step S03, notifies data-collection component 17B.

Data-collection component 17B continuously gathers data regarding usage, configuration, and context. When it receives notice of a fault from fault-detection component 17A, it gathers data appropriate to the detected fault to provide a snapshot of network management application 15 and its hardware/software environment at step S04. Once collection is complete, data collection component packages the diagnostic data, including contract identifiers, and notifies connectivity component that the diagnostic data is ready for transmission. Connectivity component 17C then transmits a support service request via Internet 40 to primary vendor 20, at step S05.

The functions performed by data-handling-and-analysis software 27 of FIG. 1 are distributed among a web services module 27A, a coordination engine 27B, an analysis agent 27C, a support knowledge base 27D, a publishing agent 27E, a notification agent 27F, and a workflow agent 27G. Coordination engine 27B manages interactions for agents 27C, 27E, 27F, and 27G, and entitlement agent 25 with each other and with web services module 27A.

The service request from customer 10 is received by web services module 27A, which performs a superficial analysis at step S06 on the diagnostic data to determine whether the request should be handled locally by primary vendor 20 or remotely by secondary vendor 30. For example, certain licensing issues are forwarded directly to secondary vendor 30 without detailed analysis by primary vendor 20. However, web services can modify the diagnostic data indicate it is being forwarded by primary vendor 20, rather than coming directly from customer 10.

Most customer requests, however, are transferred to coordination engine 27B, which is configured to recognize which agents are to act on data and in what order. First, coordination engine 27B routes the diagnostic data to entitlement agent 25 for entitlement verification (and, if necessary, entitlement reconciliation). Once entitlement is verified, the data is routed to analysis agent 27. Analysis agent can access support knowledge base 27D, which can include several databases and other sources of information. Analysis agent 27C can analyze the diagnostic using the knowledge obtained from knowledge base 27D to determine a solution. However, one possible outcome of the analysis is that further analysis by secondary vendor 30 is required. Such a determination is directed to coordination engine 27B, which transfers the diagnostic data back to web services module 27A. Web services module 27A then repackages the diagnostic data for transmission to secondary vendor 30 at step S09.

The referred request is analyzed by data-handling-and-analysis software 37 (FIG. 1), the functions of which are distributed in a manner analogous to those of data-handling-and-analysis software 27, into a web service module 37A, a coordination engine 37B, an analysis agent 37C, a support knowledge base 37D, a publishing agent 37E, a notification agent 37F, and a workflow agent 37G.

The referred request is received by web services module 37A, which determines that it is a request referred from a value-added reseller rather than an original request from a customer. The request is passed to coordination engine 37B, which submits it to entitlement agent 35. Upon entitlement verification (or reconciliation), coordination engine transfers the request to analysis agent 37C. Analysis agent analyzes the diagnostic data at step S10, making use of knowledge base 37D. Since the request is a referral from a value-added reseller, coordination engine sends the solution to web services module 37A, which forwards the solution to primary support vendor 20 at step S11.

The "solution" is received at web services module 27A, passed to coordination engine 27B, and then to analysis agent 27C. Analysis agent examines the solution, contributes any further analysis as appropriate, merges any local finding with the received solution, and updates knowledge-base 27D as appropriate at step S12. The merged solution is then transferred by coordination engine 27B to publishing agent 27E, which publishes the merged solution on website 29A at step S07. Note, depending on customer requirements, the merged solution may be packaged in another manner, e.g., conveyed by e-mail or saved to removable media and mailed to customer. Once publication to website 29A is complete, coordination engine 27B transfers (also at step S07) the request to notification agent 27F, which sends an e-mail or other notification to customer 10 than a solution is available.

Customer 10 implements the solution at step S08. This can involve reading the e-mail notification, accessing website 29A by clicking on a link in the e-mail, following procedures presented on website 29A. These can involve, for example, downloading a patch for network management application 15 and then installing it. Alternatively, customer 10 can activate a link that escalates the request into a formal support case. In this case, website 29A sends a message to coordination engine 27B, which submits the request to workflow agent 27G, which makes the request available to a support engineer.

Clearly, the support relationships can be extended to additional vendors, either by adding levels of support or more vendors at a given level, or both. So that the invention can be tailored to the needs of diverse vendors, the software server described above can be abstracted such that it provides a framework that can be adopted by other technology vendors and third party partners of the software vendor. This can be achieved by creating a framework with public interfaces that allow different data receiving and dispatching components, entitlement or authentication components, analysis components, publication components, notification components, and support case workflow components to be integrated with the framework.

These public interfaces can be implemented as programmable APIs, web services, or a combination of both interface types. The framework itself would provide a fault-tolerant automation mechanism for transferring the received data in workflow fashion between the integrated components listed above. The data receiving and dispatching interfaces of the framework can be configured so that a first framework instance can receive data, detect that the data type that should be processed by a second framework instance (which has been registered with the first framework instance for that data type), and dispatch the data to the registered second framework instead of processing it further. Data types can include sub-type directives that specify the component that should be used to initiate processing for that data type. These configurable interfaces in combination with the ability to configure registered data types allow for framework connectivity. The framework can be installed at a number of different technology vendors (including software vendors). The frameworks can be customized for each particular vendor environment and can be configured to link together in order to form a more powerful super-system.

For example, suppose a customer 10 has purchased a software product (an order processing system) from vendor 20 and a different software product (an inventory management system) from vendor 30. Since the inventory management system is used as a sub-system that integrates into the order processing system, and since primary vendor 20 has some knowledge of the secondary vendor software, customer 10 wants to simplify their support model and use only primary vendor 20 as their support contact. If primary vendor 20 needs specialized help with a complex problem that occurs in the inventory management system, then primary vendor 20 must involve secondary vendor 30 to obtain the solution before primary vendor 20 engages the customer 10.

Given the support model, primary vendor 20 installs their software diagnostics client in the customer environment. The software diagnostics client is configured to detect failures in both software packages. If a failure occurs in the order processing system, the software diagnostics client collects the fault data and sends it to the framework implemented in the primary vendor environment. The primary vendor framework detects the fault data type as primary vendor data. It is then authenticated as vendor data by the primary vendor authentication system, analyzed by the primary vendor analysis systems, and the analysis results are published to the support website for primary vendor 20. The primary vendor data finishes the processing by sending an e-mail notification to the customer, which directs the customer to the analysis report on the primary vendor website.

Now suppose that a fault occurs in the inventory management system. The diagnostics client gathers the fault data, and sends the data to its associated primary vendor framework. The primary vendor framework detects that the fault data type is secondary vendor data. It then forwards the fault data to the secondary vendor framework. The secondary vendor framework detects that the fault data is coming from primary vendor 20 and not a customer, so the secondary vendor authentication system checks to see if primary vendor 20 is a valid and registered vendor. The secondary vendor framework then analyzes the fault data with the secondary vendor analysis systems and forwards the analysis results to the primary vendor framework (since it is primary-vendor-type data and that is the registered behavior). The primary vendor framework receives the secondary vendor analysis data, authenticates secondary vendor 20, and then uses the secondary vendor analysis data as input to the primary vendor analysis systems to determine if the secondary vendor solution will cause any negative side effects in the primary vendor software. The two analysis results are then merged together and published to the primary vendor website.

Finally, the email notification is sent to customer 10. Upon clicking on a link in the email, customer 10 is directed to the primary vendors support website to accesses the analysis report. If additional assistance is needed with the solution, customer 10 can select a hyperlink on the analysis report web page to cause the primary vendor framework to open a primary-vendor support case. If the primary vendor support engineering team is unable to assist the customer, they can further escalate the issue by requesting secondary vendor 20 to open a secondary-vendor support case. These and other variations upon and modifications to the detailed embodiment are provided by the present invention, the scope of which is defined by the following claims.

What is claimed is:

1. A first-support computer system of a first support vendor comprising:
an interface for:
receiving first diagnostic data from a customer computer system of a customer,
transmitting second diagnostic data to a second-support computer system of a second-support vendor, and
transmitting notifications to said customer; and
an analysis module for
analyzing said first diagnostic data to determine whether a proposed solution should be generated a) with or b) without a response from said second computer system,
if a, making available to said customer a first-sole proposed solution without a response from said second computer system, and
if b, transmitting at least some of said diagnostic data to said second computer system and, once a response is received from said second computer system, making available to said customer a first-joint proposed solution that is a function of said response.

2. A system as recited in claim 1 further comprising a World-Wide Web server having an address, said analysis module making said first-sole or said first-joint proposed solution available at said World-Wide Web server, said interface transmitting a notification to said customer indicating said address.

3. A system as recited in claim 1 wherein said interface includes an e-mail module for e-mailing said notification to said customer.

4. A system as recited in claim 1 wherein said analysis module includes a knowledge base relating computer problems and solutions.

5. A system as recited in claim 1 further comprising an entitlement module for checking identification information received with said first diagnostic data for providing an entitlement determination whether or not said customer is entitled to said first-sole or said first-joint proposed solution, said entitlement module being coupled to said analysis module for receiving said information therefrom and for providing said entitlement determination thereto, said entitlement module, if said entitlement determination is negative, making available to said customer an entitlement procedure and then providing an affirmative indication to said analysis module if and when said customer implements said procedure;
said analysis module providing for, upon receiving an affirmative entitlement indication, making said first-sole or said first-joint proposed solution available to said customer.

6. A method comprising:
receiving, from a customer computer system of a customer, first diagnostic data associated with a problem on said customer computer system;
determining from said first diagnostic data whether a proposed solution should be generated a) with or b) without a response from a second computer system of a second support vendor;
if a, making available to said customer a first-sole proposed solution without a response from said second computer system; and
if b, transmitting at least some of said diagnostic data to said second computer system and, once a response is received from said second computer system, making available to said customer a first-joint proposed solution that is a function of said response.

7. A method as recited in claim 6 wherein said first-sole or said first-joint proposed solution is made available at an Internet address and said customer is notified of said Internet address.

8. A method as recited in claim 6 further comprising running on said customer computer system a diagnostic-data gathering program for generating said first diagnostic data.

9. A method as recited in claim 6 further comprising checking identification information received with said first diagnostic data to determine whether or not said customer is entitled to said first-sole or said first-joint proposed solution, and
if so, making said first-sole or said first-joint proposed solution available to said customer, and
if not, making available to said customer an entitlement procedure and then making said first-sole or said first-joint proposed solution available to said customer if and when said entitlement procedure is implemented.

10. A method as recited in claim 6 further comprising:
transferring second diagnostic data from said customer computer system to said second computer system;
analyzing, using said second computer system, said second diagnostic data so as to generate a second proposed solution; and
making said second proposed solution available to said customer.

11. A program set embodied in computer readable media, said program set comprising:
an analysis module for
receiving, from a customer computer system of a customer, first diagnostic data associated with a problem on said customer computer system;
determining from said first diagnostic data whether a proposed solution should be generated a) with or b) without a response from a second computer system of a second support vendor;
if a, making available to said customer a first-sole proposed solution without a response from said second computer system; and
if b, transmitting at least some of said diagnostic data to said second computer system and, once a response is received from said second computer system, making available to said customer a first-joint proposed solution that is a function of said response.

12. A program set as recited in claim 11 further comprising an interface module including a web-page generator for presenting said first-solo or said first-joint proposed solution at an Internet address, said interface module also including means for notifying said customer of said address, said interface module being coupled to said analysis module for providing said first diagnostic data thereto and receiving said first-solo or said first-joint proposed solution therefrom.

13. A program set as recited in claim 11 further comprising an entitlement program for checking identification information received with said first diagnostic data to determine whether or not said customer is entitled to said first-sole or said first-joint proposed solution, and
if not, making available to said customer an entitlement procedure which, if and when implemented, would make said customer entitled to said first-sole or said first-joint proposed solution, said entitlement program notifying said analysis program when said customer is so entitled, said analysis program providing for, upon being notified that said customer is so entitled, making said first-sole or said first-joint proposed solution available to said customer.

14. A program set as recited in claim 11 further comprising running on said customer computer system a diagnostic data program a diagnostic-data gathering program for generating said first diagnostic data.

15. A program set as recited in claim 11 further comprising:

a second analysis program running on said second-support computer system, said second analysis program providing for receiving said at least some of said diagnostic data and providing said response as a function thereof.

* * * * *